(12) United States Patent
Register

(10) Patent No.: US 11,007,679 B2
(45) Date of Patent: May 18, 2021

(54) SUPPORT TOOLING FOR COMPOSITE PARTS

(71) Applicant: The Boeing Company, Chicago, IL (US)

(72) Inventor: Justin H. Register, Charleston, SC (US)

(73) Assignee: The Boeing Company, Chicago, IL (US)

( * ) Notice: Subject to any disclaimer, the term of this patent is extended or adjusted under 35 U.S.C. 154(b) by 615 days.

(21) Appl. No.: 15/096,800

(22) Filed: Apr. 12, 2016

(65) Prior Publication Data

US 2017/0291404 A1 Oct. 12, 2017

(51) Int. Cl.
| | |
|---|---|
| B29C 33/48 | (2006.01) |
| B32B 37/06 | (2006.01) |
| B32B 37/10 | (2006.01) |
| B32B 37/14 | (2006.01) |

(52) U.S. Cl.
CPC ............ *B29C 33/485* (2013.01); *B32B 37/06* (2013.01); *B32B 37/10* (2013.01); *B32B 37/14* (2013.01); *B32B 2305/72* (2013.01)

(58) Field of Classification Search
CPC ..... B29C 33/505; B29C 33/485; B29C 33/52; B29C 53/824; B29C 33/44; B29C 33/48; B29C 33/50; B29C 33/76; B29C 70/38; B29C 70/382; B29C 70/384; B29C 70/386; B29C 70/388; B32B 37/06; B32B 37/10; B32B 37/14; B32B 2305/72
See application file for complete search history.

(56) References Cited

U.S. PATENT DOCUMENTS

| | | | |
|---|---|---|---|
| 5,366,684 A | 11/1994 | Corneau | |
| 2010/0006739 A1* | 1/2010 | Robins | B29C 70/865 249/64 |
| 2010/0139850 A1* | 6/2010 | Morris | B29C 33/485 156/242 |
| 2010/0140842 A1* | 6/2010 | Nelson | F28D 15/00 264/327 |
| 2010/0230850 A1* | 9/2010 | Sanderson | B29C 33/505 264/164 |
| 2011/0277918 A1* | 11/2011 | Lee | B29C 33/505 156/156 |
| 2012/0119412 A1* | 5/2012 | Havens | B29C 33/00 264/230 |
| 2013/0153144 A1* | 6/2013 | Tupper | B32B 37/14 156/307.1 |
| 2016/0368174 A1 | 12/2016 | Hoffman et al. | |

* cited by examiner

*Primary Examiner* — John L Goff, II

(74) *Attorney, Agent, or Firm* — Yee & Associates, P.C.

(57) ABSTRACT

Systems and methods are provided for forming composite parts. One embodiment is an apparatus that includes a forming tool. The forming tool includes a body, which includes an exterior that defines a shape for forming a laminate that will be cured into a composite part. The body also includes elements of phase change material that provide rigidity to the body below a threshold temperature, and that exhibit a phase change above the threshold temperature causing the body to become pliable. Further, the body includes flexible material that encloses the elements of phase change material.

20 Claims, 8 Drawing Sheets

SUPPORT TOOLING FOR COMPOSITE PARTS

FIELD

The disclosure relates to the field of composite parts, and in particular, to forming tools that support composite parts during autoclave curing.

BACKGROUND

Forming tools enable laminates of constituent material (e.g., carbon fiber) to be shaped into any of a variety of geometric shapes before they are cured into a composite part. Forming tools may also be utilized during curing of a laminate to ensure that the laminate does not deform or otherwise change shape while under pressure (e.g., 90 pounds per square inch (PSI) of pressure from an autoclave).

While forming tools help to ensure that a laminate achieves a desired shape, it remains a burden to remove forming tools from composite parts that exhibit complex geometries after those parts have completed curing. For example, removal of a forming tool from a composite part may require destruction of the forming tool itself. An additional problem is that if a laminate is cured in a pressurized autoclave, it may not be possible to apply desired pressure to the laminate at each location where it touches the forming tool. Furthermore, after the laminate has been cured into a composite part, it also remains desirable to remove the forming tool from the composite part without damaging the part. For these reasons, users continue to desire enhanced and strengthened forming tools.

SUMMARY

Embodiments described herein utilize forming tools that are rigid within a first range of temperatures and pliable within a second range of temperatures. In this manner, the forming tools may remain rigid while a laminate is laid-up by an Automated Fiber Placement (AFP) machine, and yet may become pliable during curing of the laminate in order to apply pressure to the laminate. After curing of the laminate into a composite part has been completed, the forming tool may be deformed and removed from the composite part. Such embodiments may even be re-usable in order to reduce the cost and time associated with generating new forming tools.

One embodiment is an apparatus that includes a forming tool for a composite part. The forming tool includes a body, which includes an exterior that defines a shape for forming a laminate that will be cured into a composite part. The body also includes elements of phase change material that provide rigidity to the body below a threshold temperature, and that exhibit a phase change at the threshold temperature causing the body to become pliable. Further, the body includes flexible material that encloses the elements of phase change material.

A further embodiment is a system for forming a laminate. The system includes a forming tool. The forming tool includes a body comprising an exterior that defines a shape for forming a laminate. The body includes elements of phase change material that provide rigidity to the body below a threshold temperature, and that exhibit a phase change at the threshold temperature causing the body to become pliable. The body also includes flexible material that encloses the elements of phase change material. The system also includes an air pressure device configured to pressurize and depressurize an internal compartment within the body to facilitate fabrication of the laminate.

A further embodiment is a method for curing a laminate into a composite part. The method includes laying up a laminate of constituent material onto an exterior of a forming tool having a rigid body, and heating the forming tool to a threshold temperature at which phase change material in the tool changes phase, causing the body to become pliable. The method also includes pressurizing an internal compartment of the forming tool to apply pressure to the laminate as the laminate cures into a composite part.

A further embodiment is an apparatus that includes a forming tool having a body and an internal compartment. The body includes a pliable matrix enclosing elements of phase change material that are rigid below a threshold temperature and that undergo a phase change above the threshold temperature. The body surrounds a pressurizable internal compartment.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
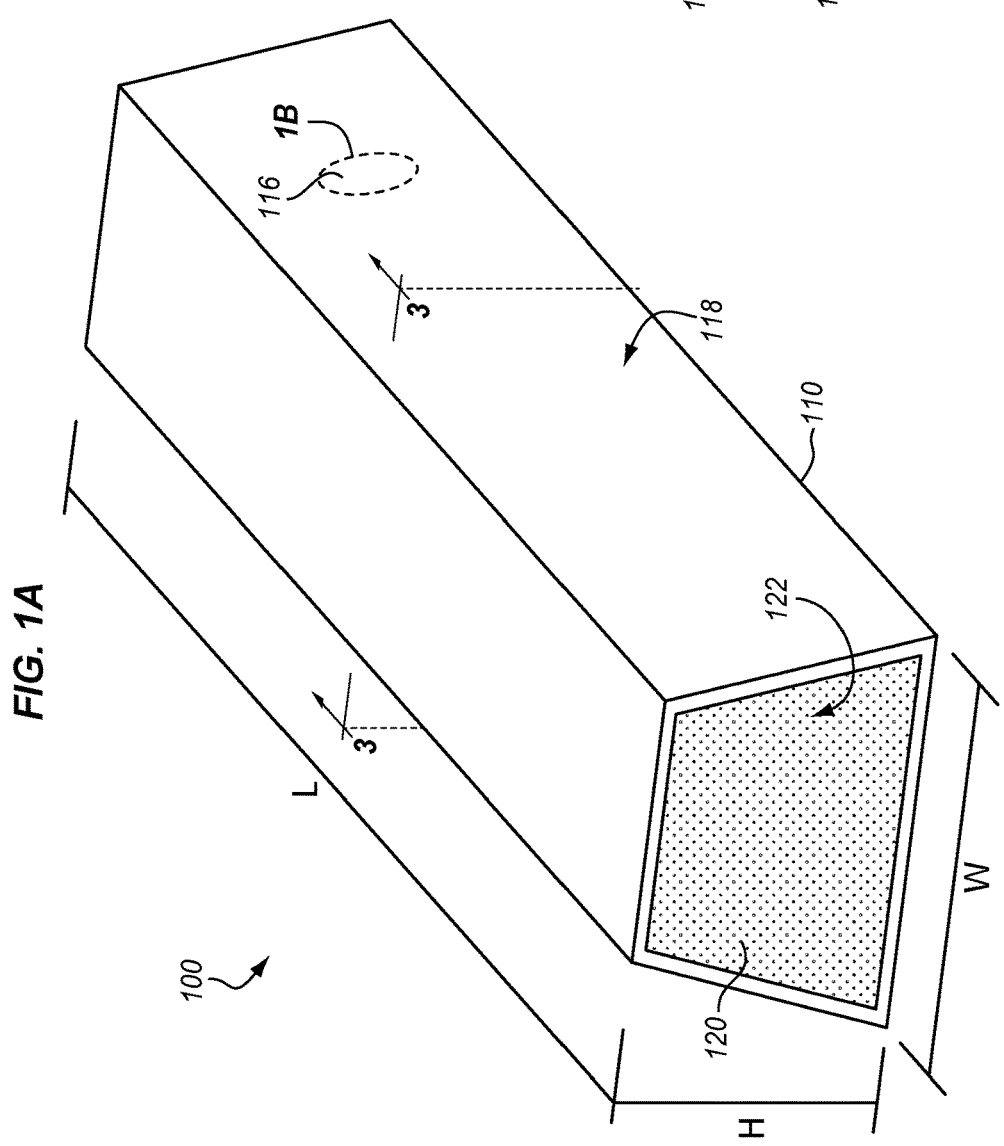
FIG. 1A is a perspective view of a selectively deformable forming tool for a composite part an exemplary embodiment.
FIG. 1B is a zoomed in view of a portion of the forming tool of FIG. 1A.

FIG. 1A is a perspective view of a selectively deformable forming tool 100 (e.g., a mandrel) for a composite part in an exemplary embodiment. Forming tool 100 is notable because it remains rigid while a laminate (not shown) is laid-up onto its body 110, and then becomes pliable in response to a change in temperature. This allows forming tool 100 to be pressurized to apply force to the laminate during curing, and/or to be depressurized to shrink forming tool 100, allowing forming tool 100 to change shape for easy removal after the laminate has been laid-up and cured into a composite part.

In this embodiment, forming tool 100 includes rigid body 110, which becomes pliable upon undergoing a phase change at a threshold temperature (e.g., 370° F.). Thus, upon reaching the threshold temperature and experiencing a sufficient influx of heat at the threshold temperature to cause a phase change, body 110 becomes pliable to the point where depressurizing internal compartment 120 (e.g., to a vacuum, or otherwise below atmospheric pressure) results in body 110 retracting in on itself. In a similar fashion, at the threshold temperature, a sufficient of outflow of heat from body 110 (i.e., cooling) causes an additional phase change that results in body 110 returning from a pliable state and becoming rigid.

As shown in FIG. 1A, body 110 includes an exterior 118 that defines a shape for the composite part. In one embodiment, exterior 118 forms an extruded trapezoid. FIG. 1B illustrates that body 110 further includes a pliable matrix of material 112 (e.g., an elastic rubber) in combination with elements 114 of a phase change material 116 (e.g., a lead/tin solder). Material 116 undergoes a phase change in response to reaching the threshold temperature, for example causing the material to melt or vaporize. Pliable material 112 surrounds elements 114, which ensures that material 116 does not drain from forming tool 100 after undergoing a phase change. Because material 116 changes phase, for example from a solid to a liquid, its rigidity is compromised and the characteristics of pliable material 112 dominate the physical characteristics of body 110. Hence, body 110 becomes pliable. Elements 114, although shown as being cylindrical, may comprise any suitable shape desired.

Internal compartment 120 of forming tool 100 is surrounded by body 110 (e.g., at locations where a laminate will be laid-up onto forming tool 100, around a perimeter of compartment 120 as shown in FIG. 1A, or completely enveloping internal compartment 120). Internal compartment 120 includes shape memory material 122. Material 122 remains solid above the threshold temperature. In one embodiment, material 122 comprises a high temperature foam. Material 122 exhibits a shape memory that returns forming tool 100 to its original shape while body 110 remains pliable (e.g., when material 122 is left at atmospheric pressure above the threshold temperature). Material 122 is also capable of being pressurized and depressurized to apply pressure to body 110, and to retract body 110 from a laminate that has been cured into a composite part. In effect, exterior 118 is retracted from the inner cured surface of the newly fabricated composite part, in a manner that prevents forming tool 100 from damaging the newly fabricated composite part. In this manner, material 122 enables forming tool 100 to be deformed to facilitate the removal of forming tool 100 from a newly fabricated composite part, and material 122 also enables forming tool 100 to be re-shaped for receiving a new laminate. In this manner, forming tool 100 may be re-used to participate in the creation of many composite parts. This renders forming tool 100 reusable for the purpose of fabricating composite parts.

Illustrative details of the operation of forming tool 100 will be discussed with regard to FIG. 2. Assume, for this embodiment, that forming tool 100 is resting at an ambient room temperature and is awaiting layup of a laminate for curing. FIGS. 3-7 are section-cut views illustrating forming tool 100 in an exemplary embodiment. Specifically, FIGS. 3-7 illustrate views shown by view arrows 3 of FIGS. 1A-B, and will be described with respect to the steps of the method of FIG. 2 below.

Figure 2:
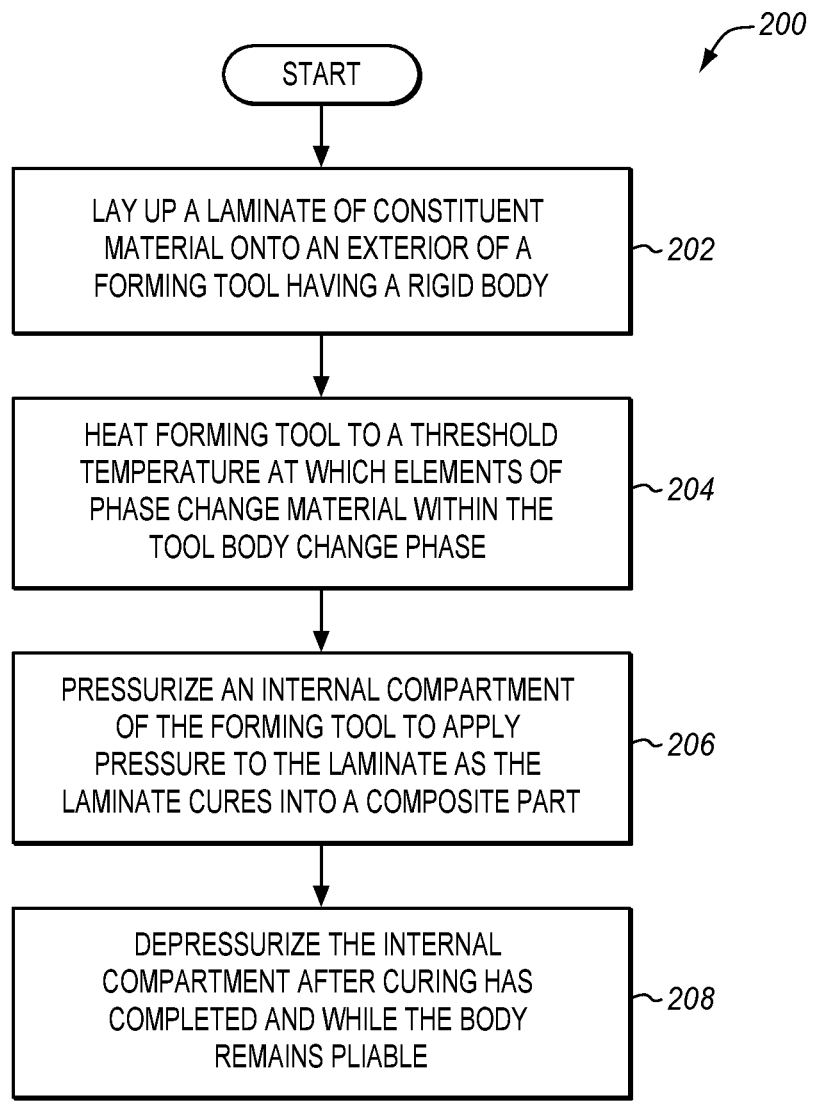
FIG. 2 is a flowchart illustrating a method for utilizing a forming tool in an exemplary embodiment.
Figure 3:
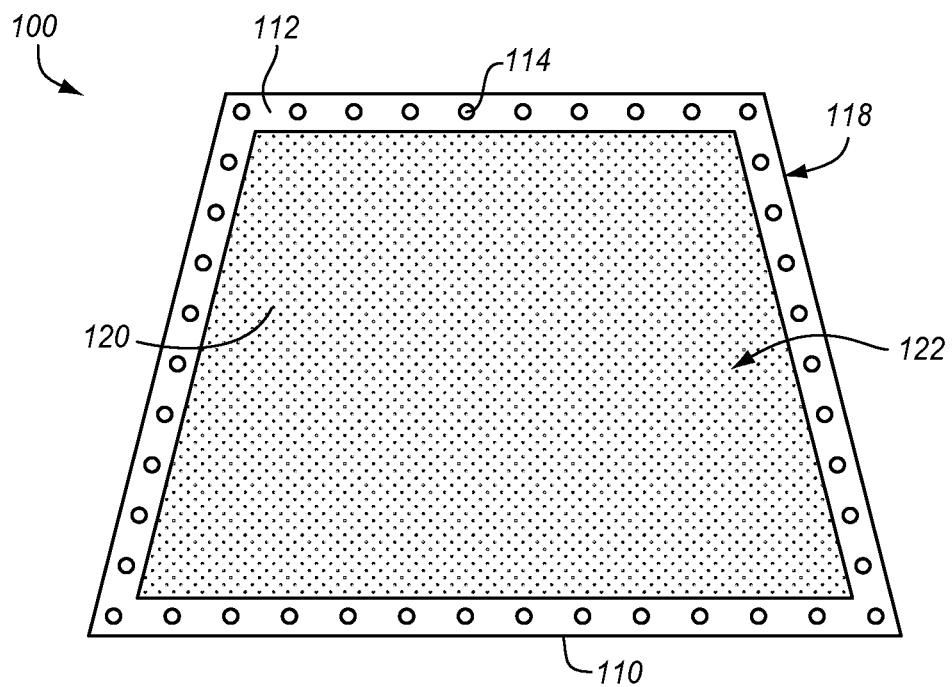
FIGS. 3-7 are section-cut views of a forming tool that shapes a laminate in an exemplary embodiment.

FIG. 2 is a flowchart illustrating a method 200 for utilizing a forming tool in an exemplary embodiment. The steps of method 200 are described with reference to forming tool 100 of FIG. 1A, but those skilled in the art will appreciate that method 200 may be performed in other environments and on other forming tools as desired. The steps of the flowcharts described herein are not all inclusive and may include other steps not shown. The steps described herein may also be performed in an alternative order.

Figure 4:
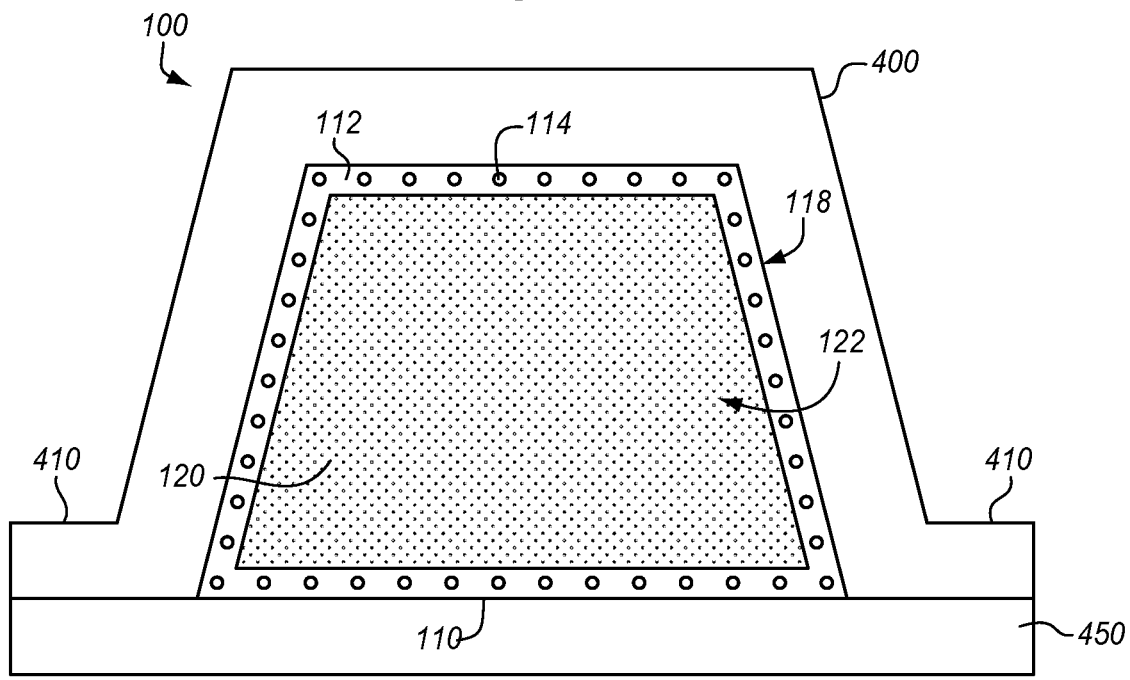
Figure 5:
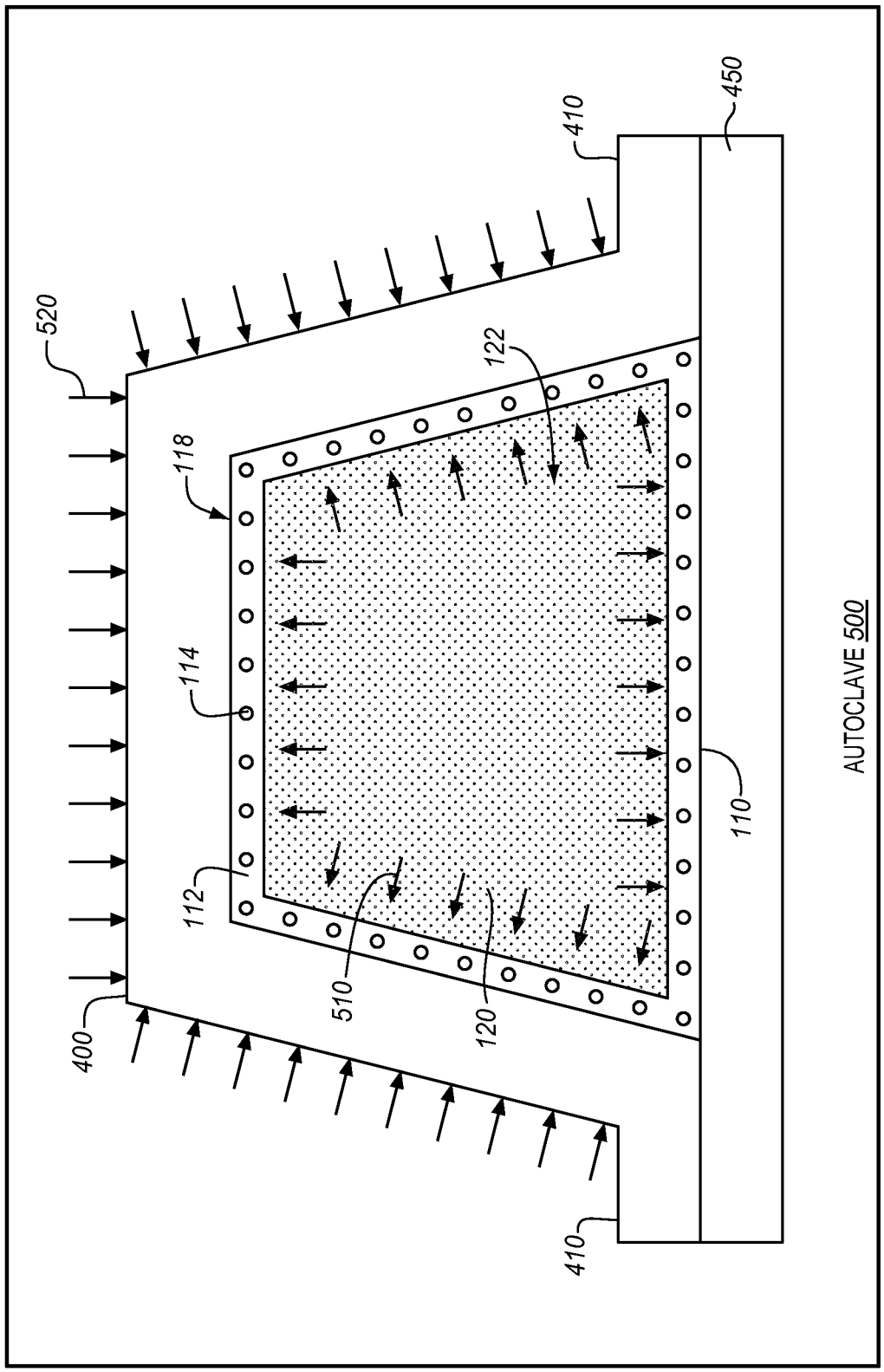

A laminate 400 is laid-up onto exterior 118 of body 110 of forming tool 100, as shown in FIG. 4 (step 202). In this embodiment, laminate 400 includes flanges 410, and a bottom panel 450. These actions may be performed, for example, by an Automated Fiber Placement (AFP) machine (not shown) in order for laminate 400 to cure into a composite part operating as a hat shaped stringer. Body 110 remains rigid during the layup process, which takes place below the threshold temperature. This rigidity ensures that forming tool 100 does not buckle or otherwise deform in response to tow pressure applied by the AFP machine while laying up laminate 400 onto exterior 118.

After layup has been completed, forming tool 100 and laminate 400 may be moved to a curing environment. An example of a curing environment is shown at autoclave 500 of FIG. 5. Autoclave 500 applies heat and pressure to laminate 400. The applied pressure 520 is indicated by arrows. As autoclave 500 continues to apply heat, tool 100 is heated to the threshold temperature, and continued influx of heat at this point causes phase change material 116 to change phase (e.g., melt), resulting in body 110 becoming pliable (step 204). Before, after, or during the heating of body 110 to the threshold temperature, internal compartment 120 may be pressurized, pressing body 110 against laminate 400. The pressurization of internal compartment 120 may be performed in order to compensate for and/or match external pressure applied to the outer surface of laminate 400 by the autoclave. Internal compartment 120 may be pressurized as part of a separate closed system from autoclave 500, and applies corresponding pressure to that of autoclave 500 (step 206). This results in pressure 510 being applied to laminate 400, which balances out pressure 520 from autoclave 500 and ensures that laminate 400 is cured at a desired temperature and pressure, without crushing forming tool 100 or otherwise forming an unintended shape. For example, in one embodiment it may be desirable to pressurize compartment 120 in order to conform forming tool 100 against the laminate 400 and stretch inner plies of laminate, thereby preventing wrinkle formation.

Figure 6:
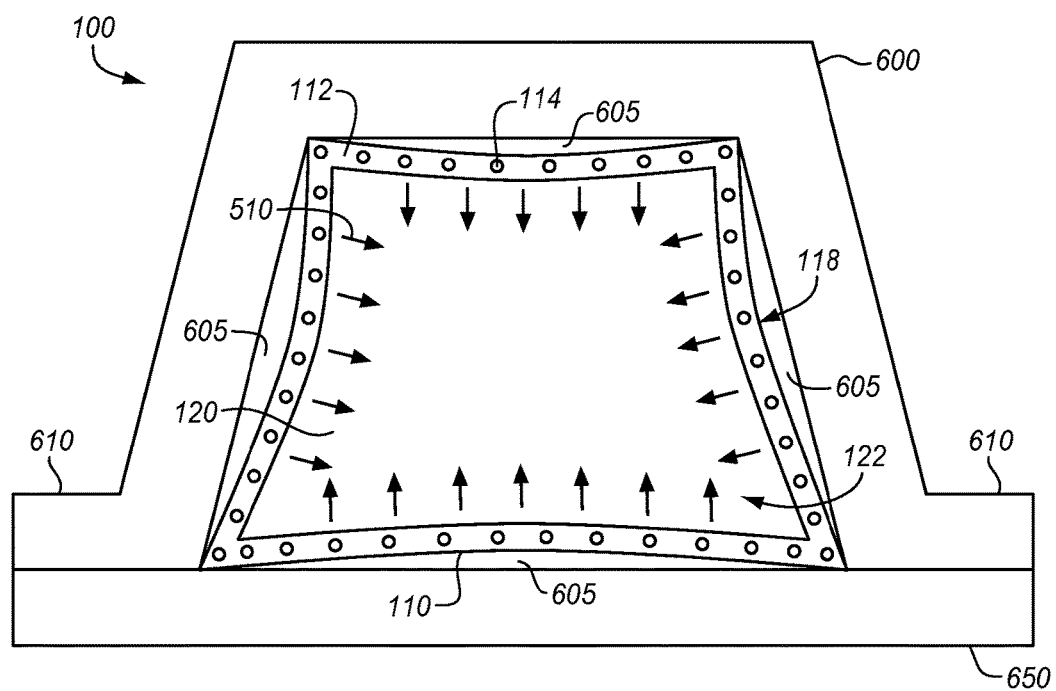
Figure 7:
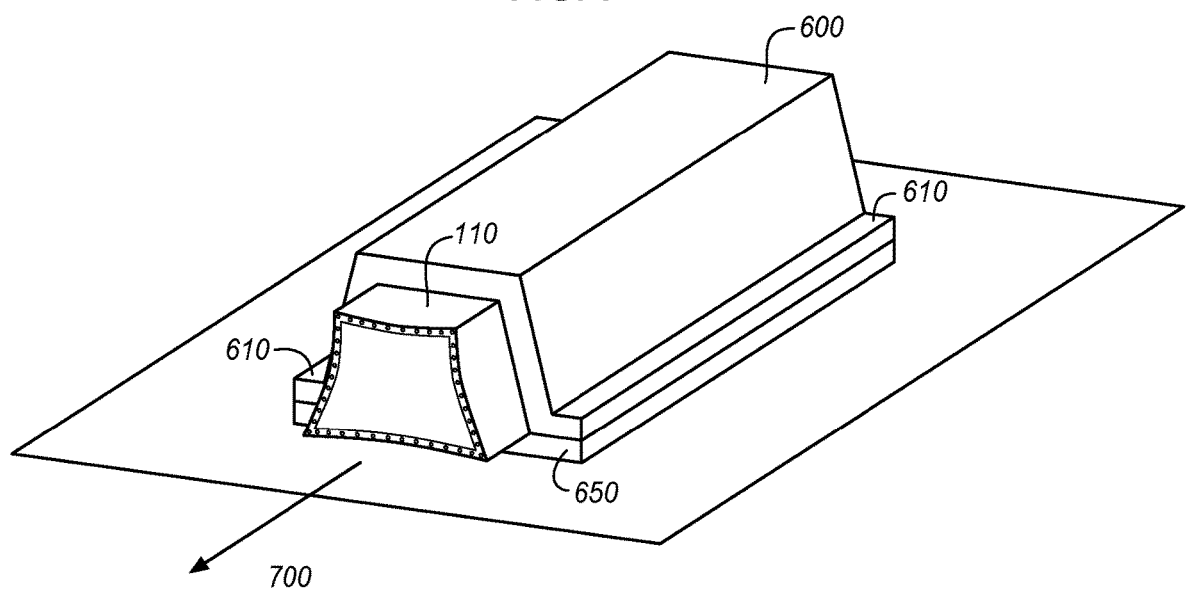

After curing has completed, laminate 400 has become a solid composite part 600 having flanges 610 and bottom panel 650, as shown in FIG. 6. In this case, composite part 600 comprises a hat-shaped stringer of an airframe of an aircraft. In this embodiment, bottom panel 650, in combination with flanges 610, enables part 600 to be attached to an inner (e.g., inboard) surface of aircraft skin. In order to facilitate removal of part 600 from forming tool 100, internal compartment 120 is deflated below the pressure of the external environment (e.g., below the pressure of autoclave 500, or below ambient atmospheric pressure) while the temperature remains above the threshold level (step 208). Since the temperature is still above the threshold level, body 110 remains pliable and exterior 118 deforms/crushes/shrinks in response to the depressurization of internal compartment 120 as shown by gaps 605 of FIG. 6. This may cause corners of body 110 to pull back/away from part 600, helping to ensure that body 110 does not bind with part 600 when forming tool 100 is removed from part 600. This facilitates retraction/removal of part 600 from forming tool 100 as shown in FIG. 7 by arrow 700.

After part 600 has been removed, forming tool 100 may be returned to ambient pressure such that both internal compartment 120 and the environment surrounding forming tool 100 exhibit the same level of pressure. While the temperature of forming tool 100 is above the threshold temperature, body 110 remains pliable. Hence, over time the shape memory properties of material 122 return/reshape forming tool 100 to the shape that it had while layup of laminate 400 was initially occurring. After forming tool 100 has returned to its original shape, forming tool 100 may be cooled to the threshold temperature. Continued cooling causes body 110 to undergo an additional phase change to become rigid once again, and eventually causes the temperature of body 110 to drop below the threshold temperature. Thus, forming tool 100 has become ready for use to fabricate another composite part.

Forming tool 100 exhibits a number of benefits over prior systems and techniques. Specifically, forming tool 100 is re-usable, capable of being easily removed from a cured composite part (e.g., without being destroyed), and is strong enough to handle layup processes that would deform weaker tools.

Figure 8:
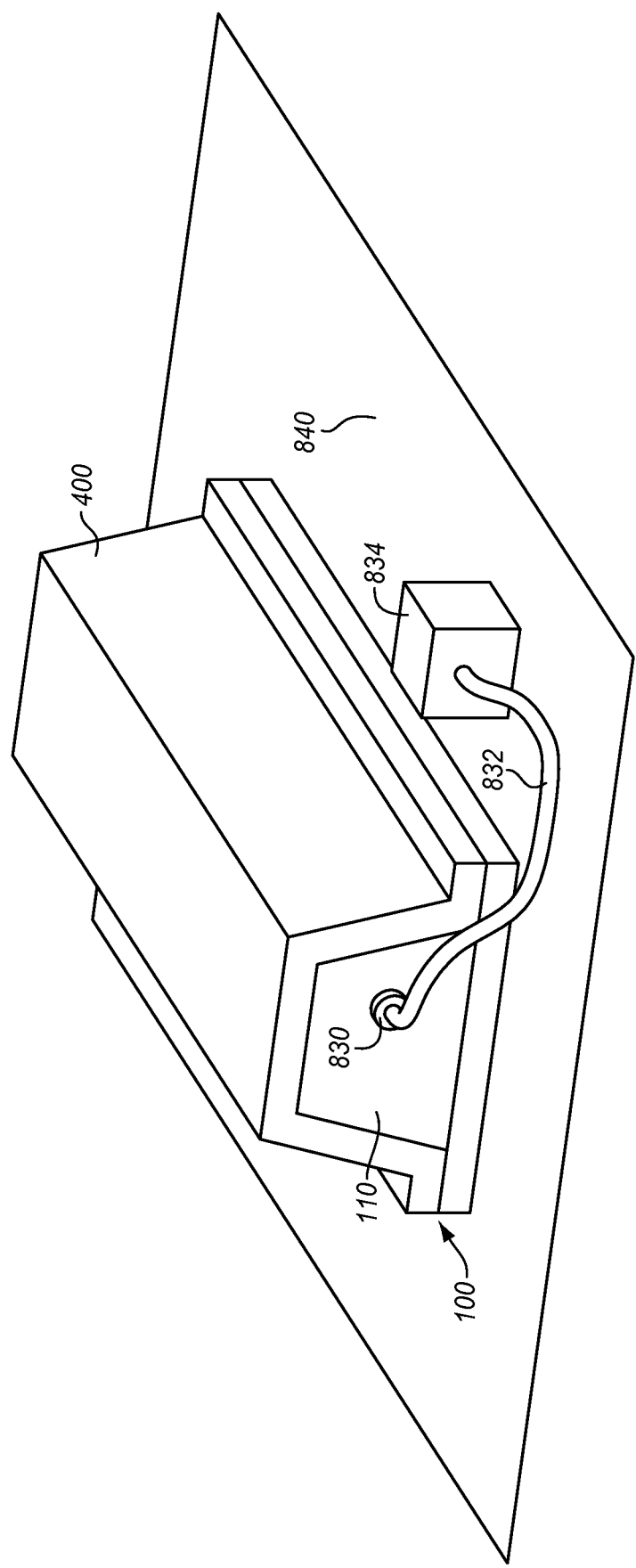
FIG. 8 is a perspective view of a forming tool that includes a port for inflating its internal compartment in an exemplary embodiment.

In a further embodiment shown in FIG. 8, forming tool 100 includes a port 830 which may be utilized to pressurize and depressurize internal compartment 120 (in this view, compartment 120 is obscured by body 110). Specifically, an air pressure device (e.g., compressor 834) may adjust the air pressure within internal compartment 120, via port 830 and pressure hose 832. This system may be utilized, for example, within autoclave 500 of FIG. 5, in order to adjust the pressure of internal compartment 120 to correspond with an external pressure applied by autoclave 500. Also, as shown in this embodiment, a base 840 of an autoclave may provide a rigid surface upon which to place forming tool 100.

EXAMPLES

In the following examples, additional processes, systems, and methods are described in the context of a reusable, re-shapeable forming tool for the fabrication of composite parts.

Figure 9:
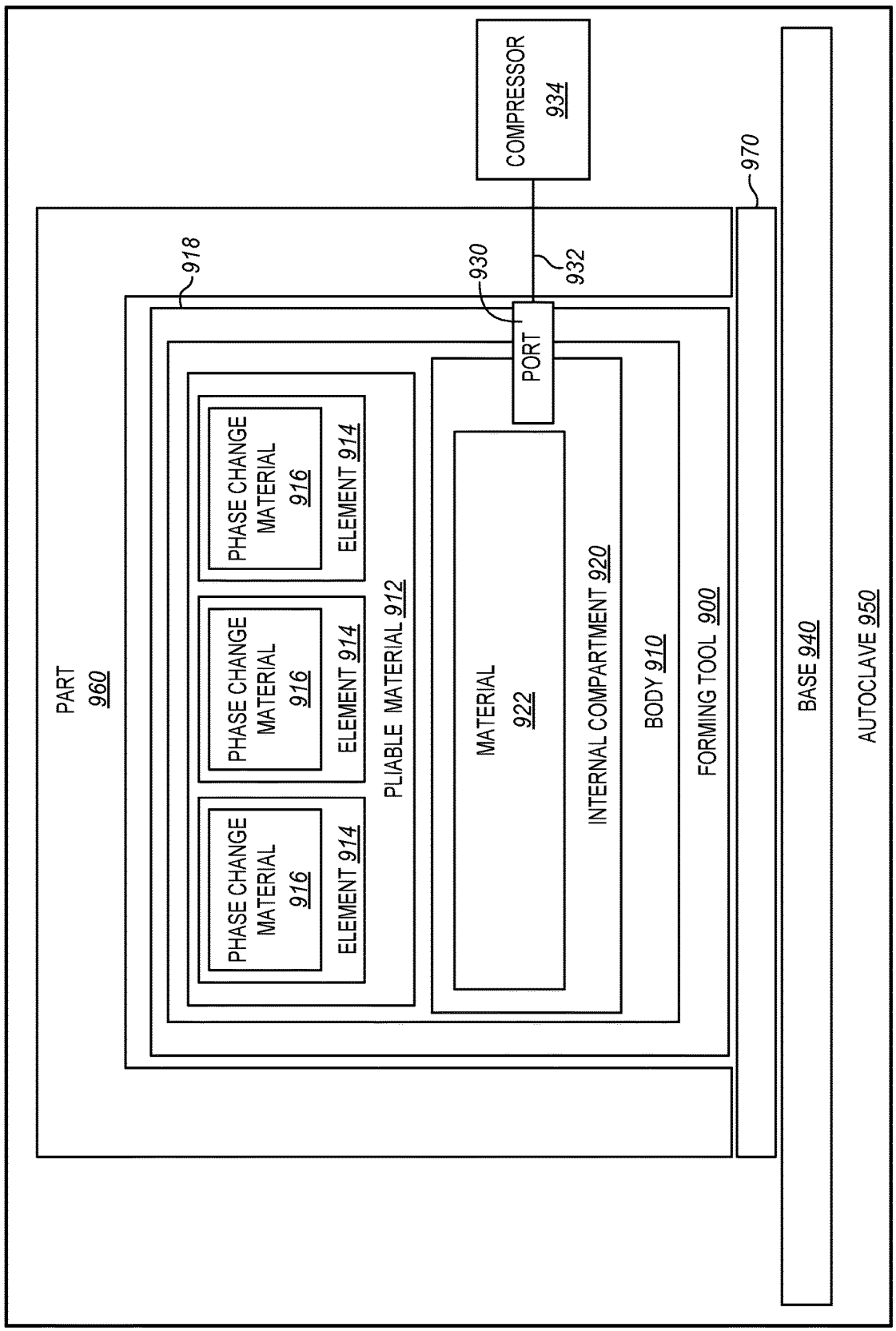
FIG. 9 is a block diagram of a forming tool in an exemplary embodiment.

FIG. 9 is a block diagram of a forming tool 900 in an exemplary embodiment. As shown in FIG. 9, forming tool 900 is placed on top of base 940 within autoclave 950. Body 910 surrounds an internal compartment 920 of forming tool 900. As shown in FIG. 9, body 910 comprises a matrix of flexible/pliable material 912, which surrounds elements 914 of phase change material 916. Body 910 further includes exterior 918, onto which part 960 is laid-up. Meanwhile, internal compartment 920 includes shape memory material 922. Material 922 may be inflated via port 930 and vacuum hose 932, for example in response to mechanical work performed by compressor 934. Utilizing forming tool 900, composite part 960 may be fabricated including bottom panel 970.

Figure 10:
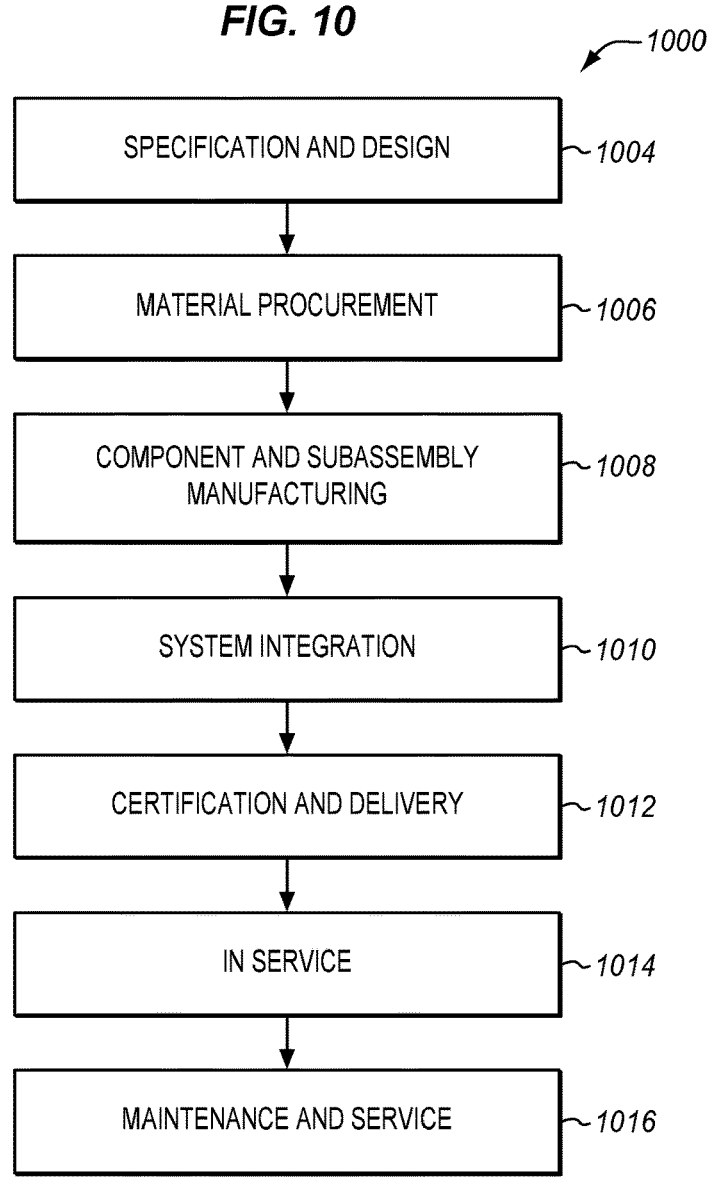
FIG. 10 is a flow diagram of aircraft production and service methodology in an exemplary embodiment.
Figure 11:
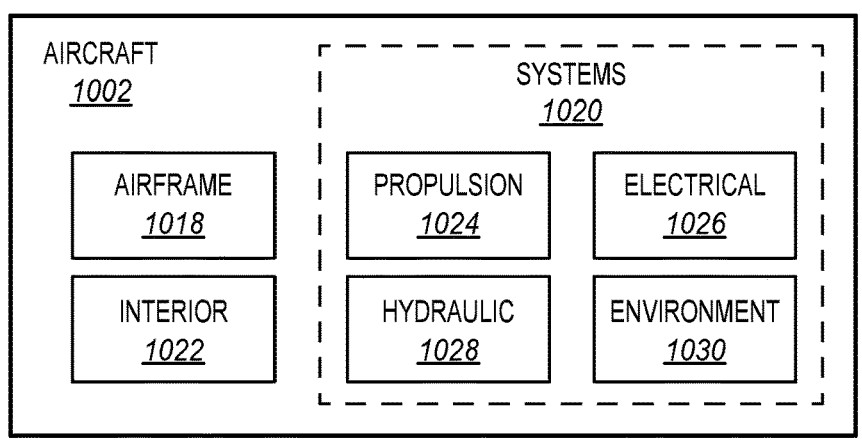
FIG. 11 is a block diagram of an aircraft in an exemplary embodiment.

Referring more particularly to the drawings, embodiments of the disclosure may be described in the context of an aircraft manufacturing and service method 1000 as shown in FIG. 10 and an aircraft 1002 as shown in FIG. 11. During pre-production, exemplary method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine maintenance and service 1016 (which may also include modification, reconfiguration, refurbishment, and so on).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1002 produced by exemplary method 1000 may include an airframe 1018 with a plurality of systems 1020 and an interior 1022. Examples of high-level systems 1020 include one or more of a propulsion system 1024, an electrical system 1026, a hydraulic system 1028, and an environmental system 1030. Any number of other systems may be included. Although an aerospace example is shown, the principles of the invention may be applied to other industries, such as the automotive industry.

Apparatus and methods embodied herein may be employed during any one or more of the stages of the production and service method 1000. For example, components or subassemblies corresponding to production stage 1008 may be fabricated or manufactured in a manner similar to components or subassemblies produced while the aircraft 1002 is in service. Also, one or more apparatus embodiments, method embodiments, or a combination thereof may be utilized during the production stages 1008 and 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation, to maintenance and service 1016. For example, the techniques and systems described herein may be used for steps 1006, 1008, 1010, 1014, and/or 1016, and/or may be used for airframe 1018 and/or interior 1022, as well as systems 1020 not limited to propulsion 1024, electrical 1026, hydraulic 1028, and environmental 1030.

In one embodiment, laminate 400 is cured into a composite part that comprises a portion of airframe 1018, and is manufactured during component and subassembly manufacturing 1008. This composite part may then be assembled into an aircraft in system integration 1110, and then be utilized in service 1014 until wear renders the part unusable. Then, in maintenance and service 1016, the part may be discarded and replaced with a newly manufactured part. Forming tool 100 may be utilized throughout component and subassembly manufacturing 1008 in order to manufacture composite parts.

Any of the various control elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus that comprises a forming tool that comprises a body that comprises:
   an exterior that defines a shape configured to form a laminate in the shape;
   elements that comprise a phase change material configured to provide a rigidity to the body below a threshold temperature, such that the elements are spaced around the body, such that a lengthwise dimension of each element of the elements extends along a lengthwise dimension of the body, and connected to each other by a pliable material that surrounds:
      each of the elements; and
      an internal compartment within the body filled with a material that consists of a shape memory material.

2. The apparatus of claim 1, further comprising:
   the shape memory material further configured to:
      retain an original shape configured to support the body against a tow pressure, responsive to a pressure inside the body and a pressure outside of the exterior of the body being equal;
      expand and press the exterior of the body into the laminate, responsive to the pressure inside the body being greater than the pressure outside of the exterior of the body at a temperature above the threshold temperature; and
      compress and retract the body away from the laminate, responsive to the pressure inside the body being less than the pressure outside of the exterior of the body;
   the elements configured to provide a pliability to the body above the threshold temperature; and
   a mechanical device comprising a vacuum configured to change the pressure inside the body.

3. The apparatus of claim 2 wherein:
   the internal compartment comprises a foam that remains solid above the threshold temperature.

4. The apparatus of claim 2, further comprising the shape memory material configured to reshape, responsive to an ambient atmospheric pressure at a temperature the threshold temperature, the body to the original shape.

5. The apparatus of claim 2, wherein the apparatus further comprises a port configured to adjust an air pressure within the internal compartment.

6. The apparatus of claim 1, wherein the phase change material comprises a solder.

7. The apparatus of claim 1, wherein the rigidity is sufficient to resist deformation of the body from a tow pressure applied by an Automated Fiber Placement (AFP) machine.

8. The apparatus of claim 1, wherein the elements that comprise the phase change material extend parallel to each other.

9. The apparatus of claim 1 wherein: the exterior defines a shape for an inner surface of a stringer of an aircraft.

10. The apparatus of claim 1, further comprising an autoclave that applies heat and pressure to the forming tool.

11. An apparatus that comprises a forming tool that comprises a body that comprises:
   an exterior configured to form a laminate configured to cure into a composite part;
   elements that comprise a phase change material configured to provide a rigidity to the body below a threshold temperature, such that the elements are spaced around the body, such that a lengthwise dimension of each element of the elements extends along a lengthwise dimension of the body, and connected to each other by that a pliable material that surrounds:
      each of the elements; and
      an internal compartment within the body filled with a material that consists of a shape memory material.

12. The apparatus of claim 11, further comprising:
   the shape memory material further configured to:
      retain an original shape configured to support the body against a tow pressure; responsive to a pressure inside the body and a pressure outside of the exterior of the body being equal;
      expand and press the exterior of the body into the laminate, responsive to the pressure inside the body being greater than the pressure outside of the exterior of the body at a temperature above the threshold temperature; and
      compress and retract the body away from the laminate, responsive to the pressure inside the body being less than the pressure outside of the exterior of the body;
   the elements configured to provide a pliability to the body above the threshold temperature; and
   a mechanical device comprising a vacuum configured to change the pressure inside the body.

13. The apparatus of claim 12, wherein the internal compartment comprises a foam that remains solid above the threshold temperature.

14. The apparatus of claim 12, further comprising the shape memory material configured to reshape, responsive to an ambient atmospheric pressure at a temperature the threshold temperature, the body to the original shape.

15. The apparatus of claim 12, wherein the apparatus further comprises a port configured to adjust an air pressure within the internal compartment.

16. The apparatus of claim 11, wherein the phase change material comprises a solder.

17. The apparatus of claim 11, wherein the rigidity is sufficient to resist deformation of the body from a tow pressure applied by an Automated Fiber Placement (AFP) machine.

18. The apparatus of claim 11, wherein the elements that comprise the phase change material extend parallel to each other.

19. The apparatus of claim 11, wherein the exterior defines a shape for an inner surface of a stringer of an aircraft.

20. The apparatus of claim 11, further comprising an autoclave that applies heat and pressure to the forming tool.

\* \* \* \* \*